United States Patent

[11] 3,619,473

[72] Inventors Alfred Meyerhoff
Greensburg;
Peter M. Guzanick, Monroeville; Walter E. Blake, Jeannette, all of Pa.

[21] Appl. No. 878,067
[22] Filed Nov. 19, 1969
[45] Patented Nov. 9, 1971
[73] Assignee Westinghouse Electric Corporation
Pittsburgh, Pa.
Continuation-in-part of application Ser. No. 700,940, Jan. 26, 1968, now abandoned.

[54] CLAMPING BRACKET FOR FLAT PACKAGE SEMICONDUCTOR DEVICES AND A SEMICONDUCTOR ASSEMBLY UTILIZING THE SAME
28 Claims, 15 Drawing Figs.

[52] U.S. Cl. .......... 174/15 R, 174/138 R, 174/DIG. 5, 317/234 A
[51] Int. Cl. .......... H01l 1/12
[50] Field of Search .......... 174/DIG. 5, 15, 16, 138, 157, 166; 24/262, 263, 263.3; 317/100, 234 (4), 234 (1.5), 234 (1.51), 234 (.6); 248/67.5, 361

[56] References Cited

UNITED STATES PATENTS

| | | | |
|---|---|---|---|
| 444,317 | 1/1891 | Potter et al. | 174/166 |
| 508,687 | 11/1893 | Duggan | 174/157 |
| 3,226,466 | 12/1965 | Martin | 174/15 |
| 3,238,425 | 3/1966 | Geyer | 317/234 (6) |
| 3,268,770 | 8/1966 | Boyer | 174/15 X |
| 3,364,987 | 1/1968 | Bylund et al. | 174/16 X |
| 3,395,321 | 7/1968 | Boyer | 317/2.34 (6) |

FOREIGN PATENTS

| | | | |
|---|---|---|---|
| 335,221 | 9/1930 | Great Britain | 174/157 |

*Primary Examiner*—Laramie E. Askin
*Attorneys*—F. Shapoe, C. L. Manzemer and Lee P. Johns

ABSTRACT: The invention relates to a mounting bracket and to an assembly for a flat-packaged semiconductor device. The primary purpose of the bracket and assembly is to apply the contacting force to a semiconductor device without distorting or bending the contacting surfaces. The mounting bracket has two spaced-apart bosses which project into apertures of each member. The boss prevents electrical short circuiting from occurring between fasteners, required to clamp the components together, and the members. The bracket has a pressure contact which may be integral with, or separate from, the assembly. The pressure contact may have either a concave flexible face or a flat face for distributing the force of the bracket to a surface of member that it is mounted on.

WITNESSES
Theodore F. Wolel
Donald M. Winegar

INVENTORS
Alfred Meyerhoff,
Walter E. Blake and Peter M. Guzanick
BY
Frederick Shapoe
ATTORNEY

CLAMPING BRACKET FOR FLAT PACKAGE SEMICONDUCTOR DEVICES AND A SEMICONDUCTOR ASSEMBLY UTILIZING THE SAME

CROSS-REFERENCE TO RELATED APPLICATION

This patent application is a continuation-in-part of copending patent application Ser. No. 700,940, filed on Jan. 26, 1968 now abandoned.

BACKGROUND OF THE INVENTION

1. Field of the Invention

This invention relates to a clamping bracket for a flat package semiconductor device and to an assembly utilizing the same.

2. Description of the Prior Art

When mounting a flat package semiconductor device between two heat sink members, one encounters several problems. One of these problems is the prevention of the distortion of the heat sink members thereby enabling one to retain a good thermal and electrical conductivity relationship between the heat sink members and the device. Another problem is the prevention of an electrical short circuit from occurring between the heat sink members and the device.

SUMMARY OF THE INVENTION

In accordance with the present invention and in attainment of the foregoing objects there is provided a clamping bracket for flat package semiconductor devices comprising a body, a pair of spaced bosses integral with a bottom portion of the body, each boss projecting away from one end of the bottom portion of the body and having an axially disposed aperture extending entirely through the boss from a surface remote from the bottom portion and through at least the bottom portion of the body.

DRAWINGS

DESCRIPTION OF THE INVENTION

Figure 1:
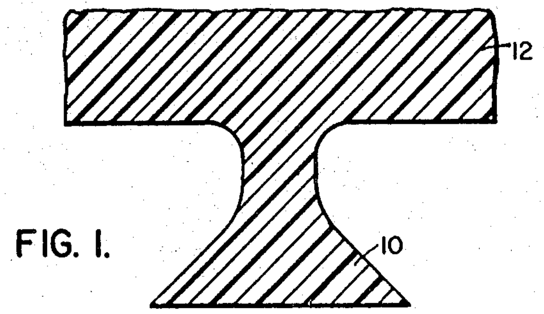
FIG. 1 is a cross-sectional view of a flat face pressure contact before force is applied to it.
Figure 2:
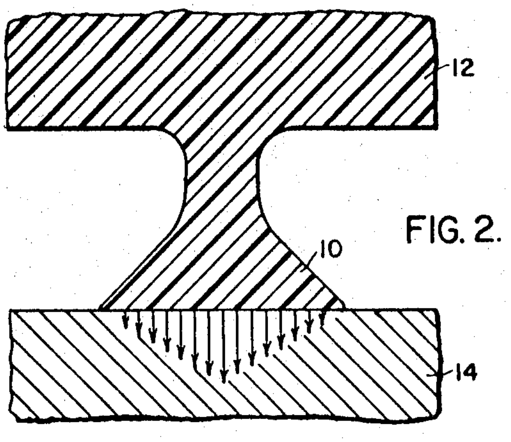
FIG. 2 is a cross-sectional view of a flat face pressure contact after force is applied to it and showing the force distribution at the contact interface.

The present invention is based upon an initial discovery that a concave flexible pressure contact face distributes a force uniformly to a surface that is contacted by the contact face. With reference to FIGS. 1 and 2 there is shown a flat face pressure contact 10 of a clamping bracket 12 and a force distribution diagram when the contact 10 is exerting a force on a heat sink member 14 and the contacting surfaces are in uniform full contact with each other. The largest force is exerted in the member 14 opposite to the center of the face of the contact 10. The force diminishes as the outer periphery of the face is approached. Additionally, any uneven contacting of the mating faces affects the force distribution.

Figure 3:
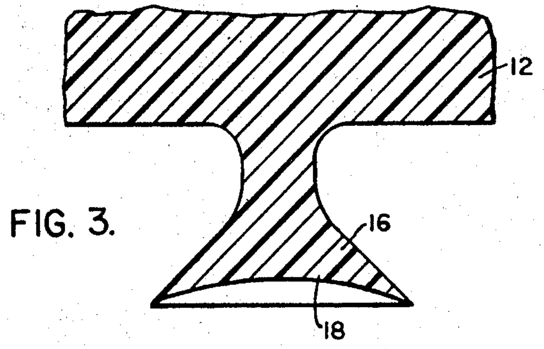
FIG. 3 is a view, partly in cross section of a concave face pressure contact before force is applied to it.

Referring now to FIG. 3 there is shown a modification of the clamping bracket 12 in which a pressure contact 16 has a concave flexible face 18. Before the contact 16 exerts any pressure the outer peripheral edge of the face 18 is further distant from the body of the bracket 12 than the center of the face 18.

Figure 4:
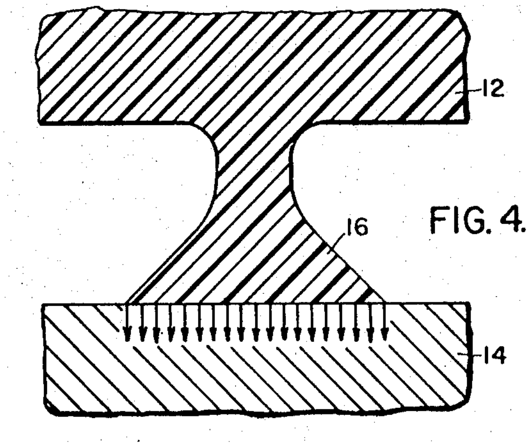
FIG. 4 is a view, entirely in cross section of a concave face pressure contact after force is applied to it and showing the force distribution of the contact.

FIG. 4 shows a force diagram when the pressure contact 16 is exerting a force on the heat sink member 14 and the concave flexible face 18 of the contact 16 is in full contact with the member 14. When the entire face 18 is in contact with the member 14, the force is uniformly distributed on the surface of the member 14 in contact with the face 18.

Figures 5, 6:
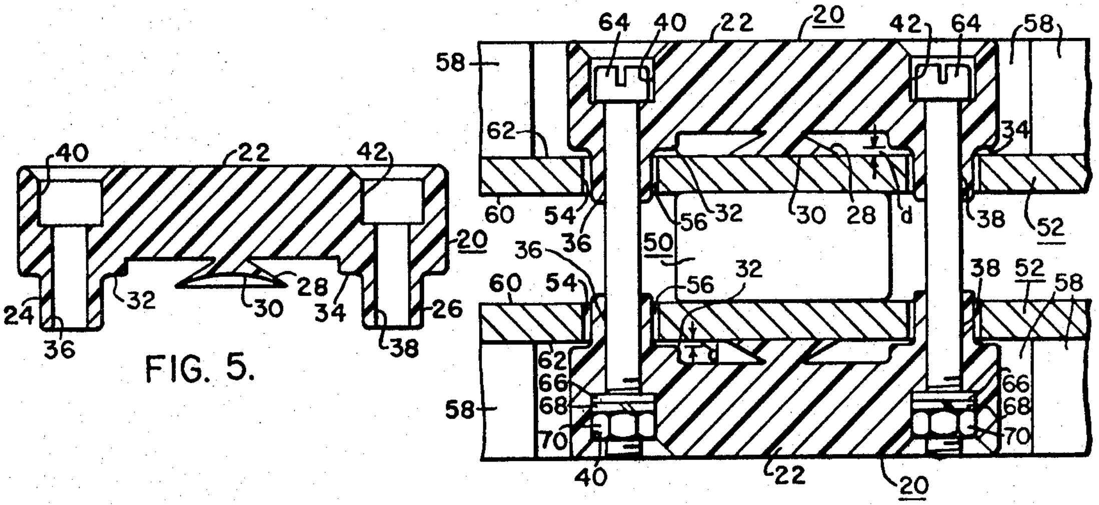
FIG. 5 is a view, partly in cross section of a clamping bracket embodying the teachings of this invention.
FIG. 6 is a view, partly in cross section of an assembly utilizing clamping brackets embodying the teachings of this invention.

Referring now to FIG. 5 there is shown a clamping bracket 20 suitable for use with flat package semiconductor devices. The bracket 20 comprises a body 22, two bosses 24 and 26 and a pressure contact 28. Although not required, the contact 28 is shown as an integral part of the body 22. The body 22 comprises any suitable nonelectrically conducting material such, for example, as glass-filled polyester, which has a sufficient flexural strength to prevent the body 22 from failing under normal stress. Preferably the flexural strength of the material comprising the bracket 20 should exceed 20,000 p.s.i.

The pressure contact 28 has a concave face 30 which functions in the manner as previously described heretofore for the face 18. The face 30 is more distant from the body 22 than shoulders 32 and 34 of the respective bosses 24 and 26. Apertures 36 and 38 extend through each end of the body 22 and the respective bosses 24 and 26. Preferably each of the apertures 36 and 38 has a respective counterbore 40 and 42 to recess the ends of fastener devices employed to join two brackets 20 together into an assembly. Recessing of the fastener devices provides a means to keep the ends of fasteners from protruding above the body 22, to minimize a potential personnel safety hazard and to reduce the possibility of corona from occurring when the semiconductor device is operated at high voltages.

With reference to FIG. 6, a flat-packaged semiconductor device 50 is mounted between two heat sink members 52. Each heat sink member 52 has two spaced-apart apertures 54 and 56, a plurality of cooling fins 58, a bottom surface 60 and a top surface 62. Each bracket 20 is mounted on the top surface 62 of the member 52 with the bosses 24 and 26 projecting respectively through the apertures 54 and 56 and the concave flexible face 30 of the pressure contact 28 in contact with the top surface 62. The brackets 20, the heat sink members 52 and the flat package semiconductor device 50 are assembled and joined together by a bolt 64 passing through each aperture 36 and 38 and a washer 66, a lock washer 68 and a nut 70 assembled on the end of each bolt 64.

Each nut 70 is tightened uniformly until the concave flexible surface 30 of the pressure contact 28 has been deformed to make a flat surface. By visually equalizing the distance between the surface of each shoulder 32 and 34 of each bracket 20 and the top surface 62 of each member 52, the assembler can prevent lopsided tightening of nuts 70 on the bolts 64. Neglect to equalize the gap between shoulders 32 and 34 and surface 62 can result in the deformation of the members 52 by squeezing them together using the device 50 as a fulcrum. This in turn could result in a gap occurring between the bottom surface 60 of each member 52 and the corresponding surface of the device 50. By preventing this gap from occurring, a good thermal and electrical conductivity relationship is maintained at all times between the device 50 and the heat sink members 52. The concave flexible faces 30 of the pressure contacts 28 assist in retaining this good relationship by distributing the applied force of the brackets 20 uniformly over the corresponding portion of the top surface 62 of each member 52 in contact with the faces 30.

The bosses 24 and 26 of the brackets 20 prevent accidental electrical short circuiting from occurring between the bolts 64 and the walls of the apertures 54 and 56 of the heat sink members 52.

The brackets 20 may be modified by molding a threaded fastener in the counterbores 40 and 42 of one of the brackets or by mechanically inserting a threaded body in the counterbores 40 and 42.

Figure 7:
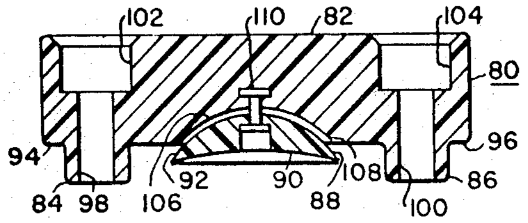
FIGS. 7 through 10 are views in cross section of modifications of the clamping bracket of FIG. 5.

Referring now to FIG. 7 there is shown a clamping bracket 80 which is a modification of the bracket 20 of FIGS. 5 and 6. The bracket 80 comprises a body 82, two bosses 84 and 86 and a pressure contact 88. The body 82 comprises the same materials as the body 22 and has the same strength requirements.

The pressure contact 88 has a concave flexible face 90 and a curved outer surface 92. The face 90 is more distant from the body 82 than shoulders 94 and 96 of the respective bosses 84 and 86. Apertures 98 and 100 extend through each end of the body 22 and the respective bosses 24 and 26. Each aperture 98 and 100 has a respective counterbore 102 and 104 to recess a fastener assembly disposed within and extending through the apertures.

The body 22 has a recess 106 formed in its surface between the bosses 84 and 86. The recess 106 has a curved surface 108 which conforms to the surface 92 of the pressure contact 88. The contact 88 is retained in an axial relationship with the recess 106 by any suitable means such, for example, as rivet 110. The contact 88 is reasonably free to float within the recess 106 and when in contact with a surface of a mating member it seats itself and uniformly transmits the force of the bracket 80 through the conforming surfaces 108 and 92 and thence through the concave flexible face 90 to the surface area of the member in contact with the face 90.

Figure 8:
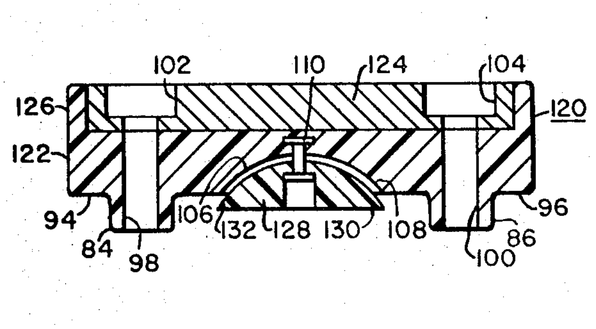

FIG. 8 depicts a mounting bracket 120 which is a modification of the bracket 80 shown in FIG. 7. All details which are the same as those previously described for the bracket 80 are identified by the same numerals. Two modifications have been made in the bracket 80. One is a modification of the body 82 and the other is in the pressure contact 88.

The mounting bracket 120 has a two component body assembly 122. The assembly 122 comprises a resilient strength member 124 mounted within a body 126 of electrically insulating material. The top surface of the member 124 may be free of insulating material. The material comprising the body 126 may be any suitable electrically insulating material such, for example, as a glass-filled polyester.

The member 124 comprises any suitable metal such, for example, as a steel which will impart good flexural strength of approximately 80,000 p.s.i. to the body assembly 122. The member 124 is employed to prevent any bending of the bracket 120 by slight abnormal overtorquing of the fasteners employed in fastening two brackets 120 to an assembly comprising a flat-packaged semiconductor device disposed between two heat sink members.

Since the brackets 120 will not deform even under slight abnormal overloads, the pressure contact does not require a flexible face. Accordingly, a pressure contact 128 having a flat face 130 and a curved surface 132 is suitably mounted, free to float, within the recess 106. The surface 132 of the contact 128 conforms to the surface 108 of the recess 106. The outer peripheral edge of the pressure contact 128 extends only slightly beyond the concave recess surface 106. The pressure contact 128 is well supported within the body assembly 122 and hence the need for a concave flexible face surface is a less stringent requirement.

When two of the brackets 120 are employed to clamp a flat-packaged semiconductor device between two heat sink members, the contact 128 seats itself within the recess 106 as the components are drawn together by applying a torque to the fasteners. The seating of the contact 128 results from the flat face 130 orienting itself to the surface of the heat sink member with which it is in contact. The force of the bracket 120 is transmitted uniformly over the area of the surface of the heat sink member in contact with the flat face 130 of the contact 128 since surfaces 108 and 132 conform and are complementary to each other.

The use of pairs of brackets 120 allows one to make a further modification possible. One of the members 124 may be modified by eliminating the counterbores 102 and 104 and threading the apertures 98 and 100 within the member 124 to engage a suitable fastener employed to join together the brackets and components mounted between them.

Figure 9:
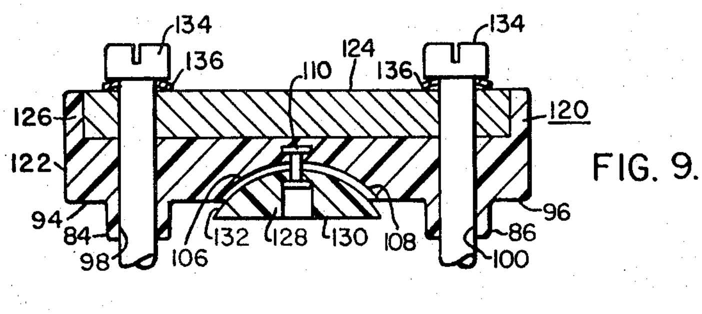

The member 124 of the bracket 120 may be modified in another way. The preferred way of clamping two brackets 120 together is to employ a machine screw 134 threaded into the member 124 of one of the brackets 120 or by using a nut fastened to the threaded end of the shank of the screw. In either case, the counterbores 102 and 104 are eliminated from the member 124 and the apertures 98 and 100 extended therethrough. A convex spring washer 136 is placed under the head of each screw 134 to assist in equalizing the load the screws 134 apply to the brackets 120. Additionally, if nuts are threaded onto the screws 134 in assembling two brackets 120, a convex spring washer 136 may be placed under each nut to assist in equalizing the loading by the screws 134. FIG. 9 illustrates these modifications.

Figure 10:
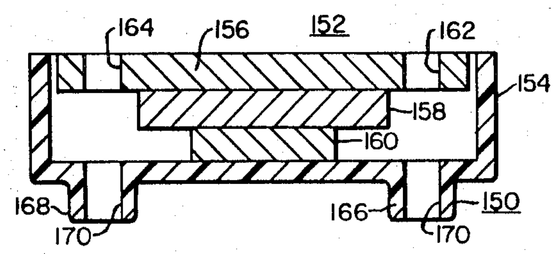

Referring now to FIG. 10, there is shown a clamping bracket 150 which is another modification of the clamping bracket 20. The material comprising the body 22 of the bracket 20, a fiber-glass-reinforced cured polyester or epoxylike resin, when employed in temperatures of from 60° C. to 125° C. flows under pressure. Consequently, an initial force of 1,000 pounds drops off to as little as 300 pounds after 48 hours at 125° C. To prevent the degradation of the applied force with increasing temperature, the bracket 150 has a leaf spring assembly 152.

Figure 15:
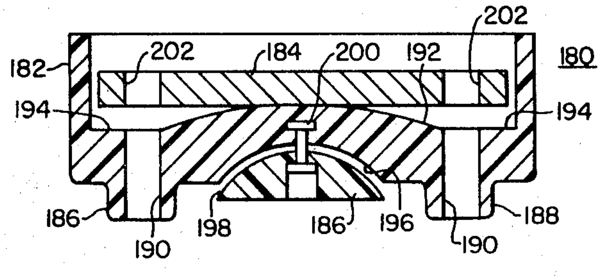
FIG. 15 is a view in cross section of a modification of the clamping bracket of FIG. 8.

The leaf spring assembly 152 is disposed within a body 154, and comprises a spring plurality of members 156, 158 and 160 each decreasing in size with the smallest spring 160 being centered on the inside surface of the bottom portion of the body 154 and acting as a fulcrum for the remainder of the springs acting in the same manner as surface 192 in bracket 180 of FIG. 15. This type spring arrangement permits the force supported by the spring assembly 152 to act directly on that opposed surface of a heat sink member mounted on a flat packaged semiconductor device. The springs 156, 158 and 160 comprise any suitable spring material such, for example, as Phosphor Bronze, an aluminum alloy, 414 stainless steel, and 1095 steel. Apertures 162 and 164 disposed in opposite ends of the leaf spring 156 permit the insertion of a fastener which is then torqued to a predetermined force, the force being imparted to the assembly 152.

The body 154 has two integral bosses 166 and 168 disposed in the bottom surface and at opposite ends of the body 154. Each of the bosses 166 and 168 has an aperture 170 aligned respectively with apertures 162 and 164 of the member 156 and in which a fastener is disposed to assemble the bracket 150 to a heat sink member. The bosses 166 and 168 project into the apertures of the heat sink member and prevent short circuiting and arcing from occurring between the fasteners and the walls of the apertures of the heat sink member.

Referring again to FIG. 6, two brackets 150 are substituted for the brackets 20. The applied force is transmitted by the leaf spring assembly 152 through that portion of the body 154 in contact therewith, thence to the portion of the heat sink members 52 in contact with the body 154 beneath the members 160 and thence to the opposed surfaces of the device 50. As the device 50 and the heat sink members 52 expand with increasing ambient temperatures and heat generated by operation of the device 50 and contract upon cooling, the spring assembly 152 is able to compensate properly for the thermal changes and thereby maintain the applied force of the brackets 150 within prescribed operational limits.

A modification of the assembly of FIG. 6 embodying the brackets 150 includes cooling the flat package electrical device 50 from one side only. Therefore, since the cooling fins 58 may also be, and usually are, electrically conductive and each forms an electrical connection to a particular region of a semiconductor element enclosed within the device 50, the removal of one of the cooling fins 58 necessitates the replacement of the cooling fins with an electrically conductive member. The member may have apertures aligned with the apertures 170 of the bosses 166 and 168 or the member may be entirely located in part between the bosses 166 and 168 of the bracket 150 and is not oriented by the bosses 166 and 168. Additionally, if the cooling fins 58 do not have sufficient structural integrity in themselves, a reinforcing member may be employed to provide the structural integrity desired thereby replacing one of the brackets 150; and the bolts 64 may threadedly engage the reinforcing member to complete the assembly.

Figure 11:
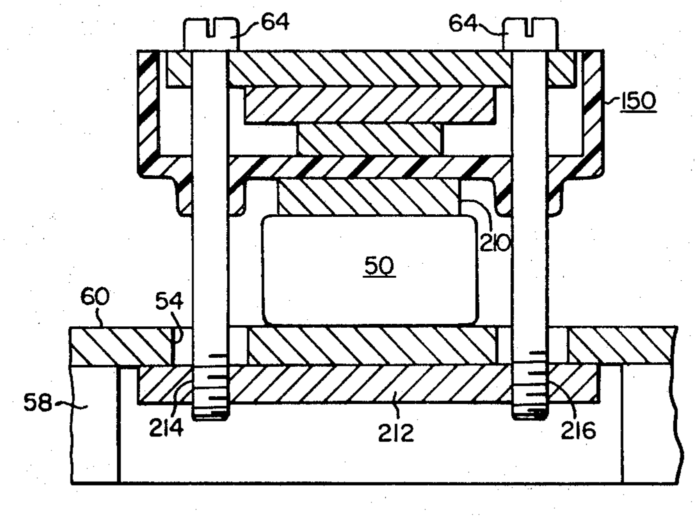
FIG. 11 is a view, partly in cross section of an assembly utilizing a clamping bracket embodying the teachings of this invention.

Referring now to FIG. 11 there is shown a modification of the assembly of FIG. 6 wherein the device 50 is cooled from only one side. Disposed in contact with one of two opposed contacting surfaces of the device 50 is an electrically and thermally conductive member 210 centered between the bosses 166 and 168 of the bracket 150. All the components, as well as the function of, the bracket 150 is the same as previously described.

Disposed in a thermal and electrically conductive contact relationship with the other contact surface of the device 50 is a cooling fin 58. To improve the structural integrity of the fins 58 a reinforcing member 212 is employed to help apply the necessary force to the opposed contacting surfaces of the device 50 to achieve the desired electrical and thermal conducting parameters established for the assembly. The member 212 may be made of any suitable nonmetallic or metallic material. The plate 212 may be made of a metal, such for example as steel, having threaded apertures 214 and 216 which engage the bolts 64 which in turn cooperate with the components of the bracket 150 resiliently urging the bracket 150, the member 210, the device 50, the cooling fins 58, and the member 212 into the necessary electrical and thermal conductive relationships required to make the assembly operable when it is connected into an electrical circuit.

Figure 12:
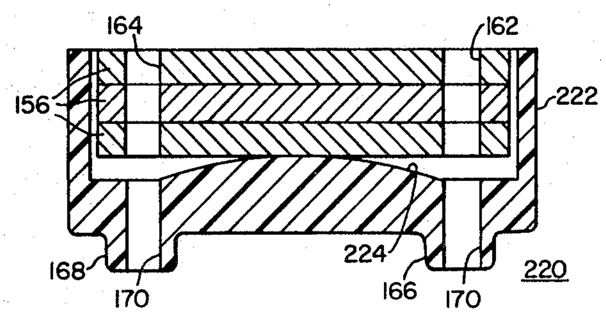
FIGS. 12 through 14 are views in cross section of modifications of the clamping bracket of FIG. 10.

The bracket 150 may be modified as illustrated in FIG. 12 by the bracket 220. In this modification, a body 222 is employed which is a modification of the body 154 of the bracket 150. The interior surface of the body 222 has a convex surface 224 as an integral part located between bosses 166 and 168. This surface 224 serves the same function as the spring member 160 of the bracket 150. Therefore, one or more spring members 156 may be disposed upon the surface 224. Any force applied to the one or more springs 156 is transmitted to the surface 224 which transmits the force through that portion of the body which it comprises to any component in physical contact therewith. The bracket 220 therefore functions in the same manner as bracket 150. All the components of the bracket 220 and the material of the body 222 are the same as for the bracket 150 and its body 154.

Figure 13:
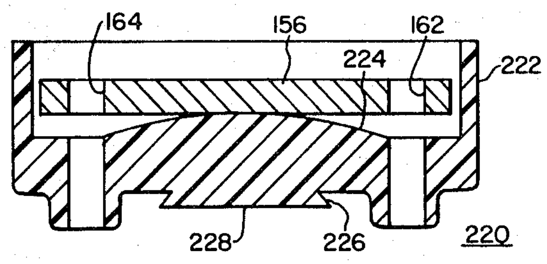

The body 222 may be further modified as shown in FIG. 13 wherein a button-shaped contact 226 protrudes from the outside of the body 222 opposite the convex surface 224 and is integral therewith. The contact 226 functions in a similar manner as contact 28 of the bracket 20. The contact 226 has a flat surface 228, the diameter of which is the same as, or smaller than, the surface of the flat package electrical device 50 which it is employed with, in any of the assemblies described with reference to FIGS. 6 and 11.

Figure 14:
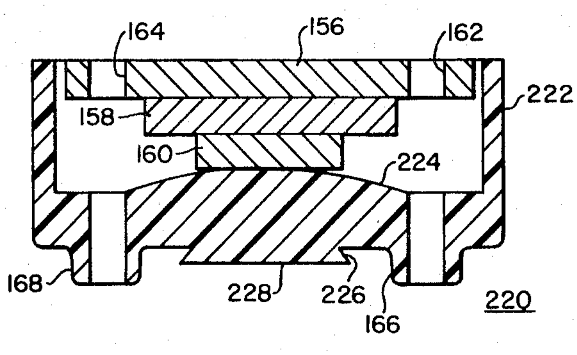

Referring now to FIG. 14 there is an alternate embodiment of the modification of the body 222 of the bracket 220 illustrated in FIG. 13. In this embodiment, springs 156, 158, and 160 are employed with and function in the same manner in the modified body 222 as they did in bracket 150 of FIG. 10.

FIG. 15 shows a mounting bracket 180 which is a modification of the bracket 120. The bracket 180 comprises a body 182, a spring member 184, and a floating flat face surface contact 186.

The body 182 comprises two integral bosses 186 and 188 disposed at opposite ends of the body 182. An aperture 190 is axially disposed in each of the bosses 186 and 188. The inside bottom surface 192 between the two apertures 190 of the body 182 has a convex surface. The brow of the convex surface coincides with the midpoint between the two apertures 190. The inside shoulder 194 of the body 182 has a top surface more remote from the top of the body 182 than the brow of the surface 192. Disposed midway in the bottom outside surface of the body 182 is a concave cavity 196.

The contact 186 has a convex surface 198, the curvature of which is the same as that of the surface of the cavity 196. The contact 186 is disposed in an axial relationship with the center of the body 182 and joined thereto by suitable means 200 such, for example, as a tubular rivet. The contact 186 is free to move restrictively both horizontally and vertically. This permits the bracket 180 to seat itself properly on a heat sink member, and under a force the surface 198 of the contact 186 conforms with the surface of the cavity 196 thereby transmitting any applied force of the bracket 180 uniformly over the surface of the heat sink member in contact with the flat face of the contact 186. The fastening means 200 therefore essentially is provided only to hold the contact 186 in place until force is applied to the clamping bracket 180.

The fastening means 200 is preferably molded in place within the bracket 180. Enough material encompasses the fastening means 200, and the means 200 is recessed far enough within the contact 186, to prevent arcing or short circuiting from occurring even if the material comprising the body 182 and the contact 186 should creep slightly under pressure at high temperature.

The leaf spring 184 has an aperture 202 in each end. The aperture 202 is aligned with the aperture 190 of the bosses 186 and 188. The spring member 184 is designed dimensionally and materially to impart a given force on the surface 192 of the body 182 when the ends of the spring member 184 are deflected a prescribed distance. The assembly shown in FIG. 15 requires a force of 1,000 pounds for the proper operation of the functional components. In such an instance the spring 184 is designed to impart a force of 1,000±10 pounds upon the surface 192 when its ends are deflected 0.025 of an inch. Suitable materials for the spring member 184 to give these results are blue tempered clock spring material made from 1095 steel and a chrome-vanadium steel.

The perpendicular distance between the plane of the brow of the surface 192 and the top surface of the shoulders 194 can be controlled to assist in the assembling of brackets 180 in an assembly such as shown in FIG. 6. The top surface of the shoulders 194 can act as a feeder gauge for determining the minimum deflection of the spring 184.

In making an assembly similar to that shown in FIG. 6, one of the brackets 20 is replaced by a mounting bracket 180 and the second of the brackets 20 is replaced by a mounting bracket 120 in which the member 124 is steel, not counterbored and having a threaded aperture at each end. Machine screws are used to assemble the brackets 120 and 180 to the heat sink members 52 and the flat-packaged semiconductor device.

We claim as our invention:

1. A clamping bracket for flat-packaged semiconductor devices comprising

A. a body;

B. a pair of spaced bosses integral with a bottom portion of said body, each boss projecting away from one end of the bottom portion of said body and having an axially disposed aperture extending entirely through the boss from a surface remote from said bottom portion and through at least the bottom portion of the body; and C. a pressure contact mounted on a surface of the bottom portion of the body between said pair of spaced bosses, the pressure contact having a concave and flexible face located less remote in distance from said surface of the bottom portion of the body than said remote surface of each boss.

2. The clamping bracket of claim 1 in which the pressure contact is integral with the bottom portion of the body.

3. The clamping bracket of claim 1 including side surfaces attached to said bottom portion of said body to define an enclosed area within the body; and including at least one spring member disposed on a surface of said pressure contact within said body, at least one of said at least one spring member having an aperture in each end axially aligned with the axially disposed aperture of one of said pair of spaced bosses.

4. The clamping bracket of claim 1 in which said pressure contact is a metal member.

5. The clamping bracket of claim 1 in which a surface of said pressure contact is a convex surface area and is integral with, and comprises in part, a surface of said bottom portion of said body.

6. The bracket of claim 1 in which the bracket contains a recess in the surface midway between the bosses, and the pressure contact is mounted within the recess, the pressure contact having a surface complementary to the surface of the recess, and means restricting the movement of the pressure contact within the recess.

7. The bracket of claim 1 in which the body comprises a metal member disposed within a member comprised of electrical insulating material, the member enclosing at least one of two opposed major surfaces and all side surfaces,. and the metal member has an aperture in each end axially aligned with the aperture of the respective boss.

8. The bracket of claim 7 in which a recess is formed in the surface of the body between the bosses, and the pressure contact is mounted within the recess, the pressure contact having a surface complementary to the surface of the recess and a flat face surface, the flat face surface of the contact projecting beyond the surface of the body and means restricting the movement of the contact within the recess.

9. The bracket of claim 8 in which the material comprising the metal member is steel and the material comprising the pressure contact is an electrically insulating material.

10. The clamping bracket of claim 1 including each boss consisting of a base portion and an axially disposed portion projecting from the base portion, the outer periphery of the axially disposed portion being less than the outer periphery of the base portion; and said pressure contact having a face located more remote in distance from said surface of the bottom portion of the body that the base portion of each boss but less remote in distance than the remote surface of each boss is from the surface of the bottom portion of the body.

11. The bracket of claim 10 in which the body comprises an electrically insulating material.

12. The bracket of claim 10 in which the face of the pressure contact is concave and flexible.

13. The bracket of claim 12 in which the pressure contact is integral with the body.

14. The bracket of claim 10 in which the bracket contains a recess in the surface midway between the bosses, and the pressure contact is mounted within the recess, the pressure contact having a surface complementary to the surface of the recess, and means restricting the movement of the pressure contact within the recess.

15. The bracket of claim 14 in which the body is hollow, and at least one spring member is disposed within the hollow body, the spring member having an aperture in each end corresponding to the respective aperture of each boss.

16. The bracket of claim 14 in which the body is hollow, the bottom inside surface of the body is convex, and at least one spring is disposed within said hollow body on the convex surface, the spring member having an aperture in each end corresponding to the respective aperture of each boss.

17. The bracket of claim 10 in which the body comprises a metal member disposed within a member of electrical insulating material, the member enclosing at least one of two opposed major surfaces and all side surfaces, and the metal member has an aperture in each end axially aligned with the aperture of the respective boss.

18. The bracket of claim 17 in which a recess is formed in the surface of the body between the bosses, and the pressure contact is mounted within the recess, the pressure contact having a surface complementary to the surface of the recess and a flat face surface, the flat face surface of the contact projecting beyond the surface of the body and means restricting the movement of the contact within the recess.

19. The bracket of claim 18 in which the material comprising the metal member is steel and the material comprising the pressure contact is in electrically insulating material.

20. An electrical assembly comprising

A. a flat-packaged semiconductor device having two major opposed surfaces;

B. an electrically and thermally conductive member disposed on each of the two major opposed surfaces, at least one of said electrically and thermally conductive members being a heat sink member having two spaced apertures extending entirely through a portion of the heat sink member, said semiconductor device being oriented on a surface of the heat sink member between the spaced apertures;

C. at least one clamping bracket disposed on a surface of one of the electrically and thermally conductive members, said bracket comprising a pair of spaced bosses integral with a bottom portion of a body, each boss projecting away from each end of the bottom portion of said body and having an axially disposed aperture extending entirely through the boss from a surface remote from said bottom portion and through at least the bottom portion of the body, and a pressure contact mounted on a surface of the bottom portion of the body between said pair of spaced bosses, at least a portion of the bottom portion of said body abutting said at least one electrically and thermally conductive member;

D. a first assembling means disposed in abutting contact with one of said electrically and thermally conductive members and having a pair of spaced apertures axially aligned with the apertures of said body and said heat sink member; and E. a second assembling means disposed within the apertures of said body, said at least one heat sink member and said second assembling means whereby said electrically and thermally conductive members are urged into a pressure electrical and thermally conductive relationship with the respective surfaces of said flat package semiconductor device.

21. The electrical assembly of claim 20 wherein the pressure contact of said clamping bracket has a face located less remote in distance from said surface of the bottom portion of the body than said remote surface of each boss.

22. The electrical assembly of claim 21 wherein each boss of said clamping bracket consists of a base portion and an axially disposed portion projecting from the base portion, the outer periphery of the axially disposed portion being less than the outer periphery of the base portion.

23. The electrical assembly of claim 21 wherein each electrically and thermally conductive member is a heat sink member, said first assembling means is a second clamping bracket like the first clamping bracket; including each boss of each clamping bracket projecting into an aperture of a heat sink member, and the face of said pressure contact of each clamping bracket is in contact with a surface of one of the heat sink members.

24. The electrical assembly of claim 20 in which the body of each clamping bracket comprises a metal member disposed within a second member of electrical insulating material, and the metal member has a hole in each end axially aligned with the aperture of the respective boss, and the pressure contact is mounted within a recess of the body.

25. The electrical assembly of claim 24 in which the metal member is a spring member.

26. The electrical assembly of claim 24 in which the metal member consists of at least one spring member, the bottom inside surface of the second member has a convex surface portion, and the spring member is disposed on the convex surface portion.

27. The electrical assembly of claim 20 wherein said clamping bracket has side surfaces attached to said bottom portion of said body to define an enclosed area within the body, and said pressure contact of said body is mounted on a surface of said bottom portion between said pair of spaced bosses; and including at least one spring member disposed on a surface of said pressure contact within the body, at least one of said at least one spring member having an aperture in each end axially aligned with the axially disposed aperture of one of said pair of spaced bosses.

28. The electrical assembly of claim 27 wherein said body comprises an electrically insulating material and said pressure contact is a metal member.

* * * * *